(No Model.)

W. I. LEGGETT.
CAKE REST OR HOLDER.

No. 508,176. Patented Nov. 7, 1893.

Witnesses:
C. H. Raeder
N. F. Matthews

Inventor
Walter I. Leggett.
By James J. Sheehy
Attorney

UNITED STATES PATENT OFFICE.

WALTER I. LEGGETT, OF GALESBURG, ILLINOIS.

CAKE REST OR HOLDER.

SPECIFICATION forming part of Letters Patent No. 508,176, dated November 7, 1893.

Application filed July 21, 1893. Serial No. 481,140. (No model.)

*To all whom it may concern:*

Be it known that I, WALTER I. LEGGETT, a citizen of the United States, residing at Galesburg, in the county of Knox and State of Illinois, have invented certain new and useful Improvements in Cake Rests or Holders; and I do declare the following to be a full, clear, and exact description of the invention, such as will enable others skilled in the art to which it appertains to make and use the same.

This invention has relation to an improvement in cake rests or holders, and it has for its object to provide such a device at a minimum expense, and one which will obviate the objectionable falling of the cake in the middle or center, and which will permit the bottom of a cake to cool quickly, and thereby render the cake free from moisture and stickiness at the bottom.

Other objects and advantages will appear from the following description and claims when taken in connection with the annexed drawings in which—

Figure 1:
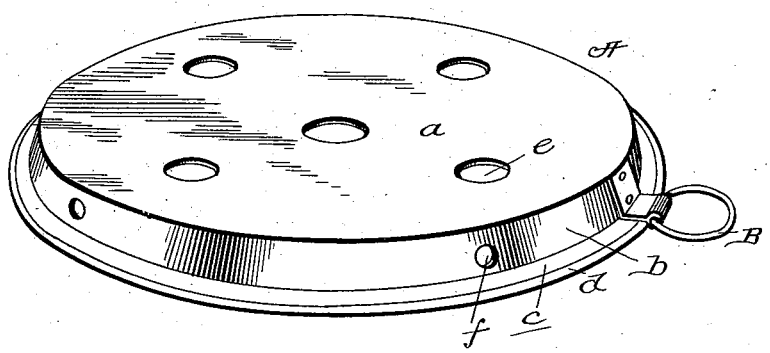
Figure 2:
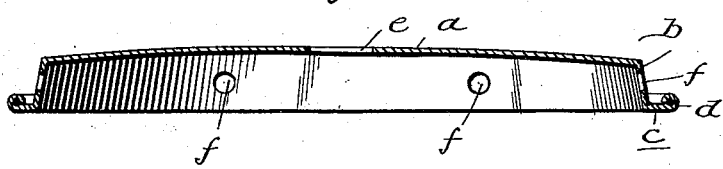

Figure 1, is a perspective view of my improved device, and Fig. 2, is a vertical, diametrical, sectional view of the same.

Referring by letter to said drawings: A, indicates my improved cake rest or holder. This rest may be formed from tin, sheet metal, earthen-ware, or other suitable material.

In the present embodiment of my invention I have shown the device as formed from sheet metal, which may be struck or sprung up from a piece of material with a flat top $a$, slightly raised or bulged toward its center, as better shown in Fig. 2, of the drawings. This top has a marginal, skirt flange $b$, and terminates in an outwardly directed, annular, horizontal flange $c$, which may have its edge turned inwardly or rolled as shown at $d$. The top $a$, is provided with a suitable number of holes $e$, and the flange $b$, is also provided with holes $f$, a ring E, being provided for hanging the device upon a nail, hook, or the like. The base flange $c$, is sufficiently broad to give the device a firm bearing upon a table, cake dish, or other support.

It is well known by cooks and others that cakes when placed in dishes or left in the baking pan, cool very slowly on the bottom, owing to the fact that the cake is not exposed at the bottom, and consequently cannot cool until the top or upper portion has first cooled. This causes a great deal of moisture to remain in the bottom, and renders the cake heavy, and causes it to stick to the pan or dish. It is also well known that with jelly, layer cakes, and the like, when allowed to cool by this process, the centers fall, which is very objectionable.

By my improved holder, the cake is given a slightly raised appearance in the center, and allowed to cool quickly at the bottom by having the top of the holder elevated and perforated, and the flange also perforated to admit of a free circulation of air beneath the bottom of the holder.

The holder is made comparatively flat in contour so as to occupy but little space, and it may thus be conveniently placed upon a cake dish, while but very little of the holder will be exposed to view.

While I have shown and described the device as being made of sheet metal, and such material is preferable for the sake of cheapness in manufacture as well as lightness and durability, yet it is obvious that it may be made of earthen-ware, wood, china, or other suitable material.

Having described my invention, what I claim is—

1. As an improved article of manufacture, the cake holder having a perforated top raised toward the center and a marginal, skirt flange also perforated and supporting the top, and a base flange turned outwardly, substantially as specified.

2. As an improved article of manufacture, the cake holder or rest having a perforated, top raised toward the center, and a supporting marginal, skirt flange, also perforated, substantially as specified.

In testimony whereof I affix my signature in presence of two witnesses.

WALTER I. LEGGETT.

Witnesses:
SETH W. MEAD,
I. B. BOGGS.